United States Patent
Wu

(10) Patent No.: US 11,977,152 B2
(45) Date of Patent: May 7, 2024

(54) DIRECTION FINDING TECHNIQUE IN RADAR ARRAY SIGNAL PROCESSING

(71) Applicant: Yuetong Wu, Philadelphia, PA (US)

(72) Inventor: Yuetong Wu, Philadelphia, PA (US)

( * ) Notice: Subject to any disclaimer, the term of this patent is extended or adjusted under 35 U.S.C. 154(b) by 8 days.

(21) Appl. No.: 17/643,833

(22) Filed: Dec. 12, 2021

(65) Prior Publication Data

US 2023/0184936 A1     Jun. 15, 2023

(51) Int. Cl.
*G01S 15/42*     (2006.01)
*G01S 3/80*     (2006.01)

(52) U.S. Cl.
CPC ............ *G01S 15/42* (2013.01); *G01S 3/80* (2013.01)

(58) Field of Classification Search
CPC .................................. G01S 15/42; G01S 3/80
See application file for complete search history.

(56) References Cited

U.S. PATENT DOCUMENTS

2023/0184936 A1*   6/2023   Wu ........................... G01S 3/80
                                                                                                  367/118

OTHER PUBLICATIONS

Li et al., DOA Estimation for Echo Signals and Experimental Results in the AM Radio-Based Passive Radar, Nov. 12, 2018, pp. 73316-73327. (Year: 2018).*
Capon, J. "High-resolution frequency-wavenumber spectrum analysis." Proc. IEEE. vol. 57, pp. 1408-1418, Aug. 1969. (Year: 1969).*
Schmidt, R. O. "Multiple emitter location and signal parameter estimation." IEEE Trans. sonar and Propagat. AP- 34(3): 276-280. Mar. 1986. (Year: 1986).*
Barrick, D. E., and B. J. Lipa. "Evolution of bearing determination in HF current mapping radars." Oceanography. vol. 10. No. 2, pp. 72-75. Jan. 1997. (Year: 1997).*

* cited by examiner

*Primary Examiner* — Daniel Pihulic

(57) ABSTRACT

This invention describes a new Direction Finding (DF) algorithm named as Braided Array Sampling via an Inter-Channel Scheme (BASICS) that can enhance estimation accuracy of the direction of arrival (DOA) to a higher level than existing algorithms. With appropriate analogical reasoning, it can be applied to all kinds of radars and antennas. It breaks the ordinary belief that an array of N antennas can only generate N pictures of spectral for analysis. Without the need of improvement on the system hardware, BASICS assumes many virtual movements of array antenna in order to produce enough linear equations describing Doppler modulations of targets' spectra by those of the virtual movements, and the solutions would give accurate DOA information of possible targets. This invention presents the principle of BASICS and its theoretical supports, as well as the basic conditions to apply BASICS.

7 Claims, 3 Drawing Sheets

DIRECTION FINDING TECHNIQUE IN RADAR ARRAY SIGNAL PROCESSING

CROSS-REFERENCE TO RELATED APPLICATIONS

Provisional patent: 63/124,804, A Novel Direction-Finding Technique in Radar Array Signal Processing

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention is in the field of radar signal processing. People use antenna array to obtain the information of location and vector velocity of objects they want to detect. By using multiple antennas located in a compact area, the bearing of objects can be figured out from the phase and amplitude differences between echoes received by each antenna. This is the prerequisite of Direction Finding (DF) algorithms. A DF algorithm is a process executed by firmware in receiver or computer software to estimate the bearing of targets detected by radars. The bearing is usually called Direction of Arrival (DOA) or Azimuth of Arrival (AOA). DOA estimation capability is the key concern in array design and signal processing. There are two categories of DOA estimation techniques, Beam Forming (BF) and Direction Finding (DF). The BF techniques are widely applied in radar systems where analog or digital controlled transmitting/receiving beams are steered to find targets' bearings. J. Capon in 1969 proposed a BF algorithm called Minimum Variance Method (MVM), in which an adaptive beam is formed to minimize the power output of the array while keep the array response to the designated direction as constant. This method is considered as the first to obtain higher resolution than Rayleigh resolution limit of an array. The accuracy of BF detecting results depends on array aperture size, and higher accuracy requires larger array deployment. In cases of limited space for array occupation, DF techniques are applied to estimate DOAs for sparsely distributed targets. DF algorithms exploit the phase and amplitude differences of signals received by each antenna in an aperture limited array. A simple and conventional method of DF technique is to use two orthogonal loop antennas, taking the ratio of signals received by each, then using the arctangent function to extract the single target's DOA. It often fails when there exist more than one targets or when antenna patterns are heavily distorted. Many studies have been carried out on sub-space based DF methods like MUltiple Signal Classification (MUSIC) and Estimation of Signal Parameters via Rotational Invariance Techniques (ESPRIT), etc. They have higher angular resolution than conventional BF methods. MUSIC algorithm by Schmidt applies eigenspace method to the correlation matrix of array signals, so that N antennas can generate up to N−1 signal bearings and a noise signal. It outperforms conventional DOA algorithms since it takes advantage of the orthogonality between signal subspaces and those of noises. An important prerequisite of MUSIC is that the number of targets should be known in advance, which is also the main drawback of MUSIC. By building a, relation between Vandermonde matrix of sinusoids and covariance matrix of measured data, ESPRIT derives a matrix containing rotational information with respect to DOA information of targets, then they can be obtained directly from immediate matrix calculations.

Modern Doppler radars adopt coherent cumulation to obtain spectra of moving targets. The coherent cumulative time lasts from seconds to hundreds of seconds depending on the stationarity of the target's echoes. In Doppler radars, the methods mentioned above have in common that the time series signals received via an antenna channel are processed solely irrelevant to other channels all the way to where the Doppler spectra are calculated, and DOA estimation process starts then. This invention proposes an alternative and innovative method to tackle DOA problem in Doppler radars by "braiding" time series signals among channels before Doppler spectra are obtained. The "braiding" processing is equivalent to introducing a virtual movement to an array antenna while it is receiving echoes from far-field targets. Thus, the Doppler information obtained by this way contains both the Doppler shifts of the targets and those of the virtual movement of the antenna. There are different ways to "braid" time series signals among antenna channels, which means many virtual movement routines could be fabricated to modulate real Doppler shifts of targets. The modulations can be expressed mathematically by a system of linear equations. By solving them the Doppler spectra from each azimuthal direction is then obtained, and possible target(s) in this direction would be discerned as they appear to be peak(s) in the spectra.

There are real-life examples of arrays of moving antennas, but constructing such an array costs much more than stationary antennas and is hard to achieve. This invention presents a technique called Braided Array Sampling via an Inter-Channel Scheme (BASICS) that can randomly braid inter-channel signals among stationary antennas to generate the same effect as moving antennas. By this means, BASICS can take the advantage of the high accuracy of DOA estimation of the moving antennas without building them.

SUMMARY OF THE INVENTION

This invention is in the field of radar signal processing. This invention presents a technique called Braided Array Sampling via an Inter-Channel Scheme (BASICS) that can randomly braid inter-channel signals among stationary antenna channels in Doppler radar in order to generate the same effect as moving antennas. By this means, BASICS can take the advantage of the extra Doppler information of the virtually moving antenna to figure out targets' DOAs without actually letting it move. This invention presents the principle of BASICS and its theoretical supports, as well as the basic conditions to apply BASICS.

DETAILED DESCRIPTION OF THE INVENTION

1. Signal Model

Figure 1:
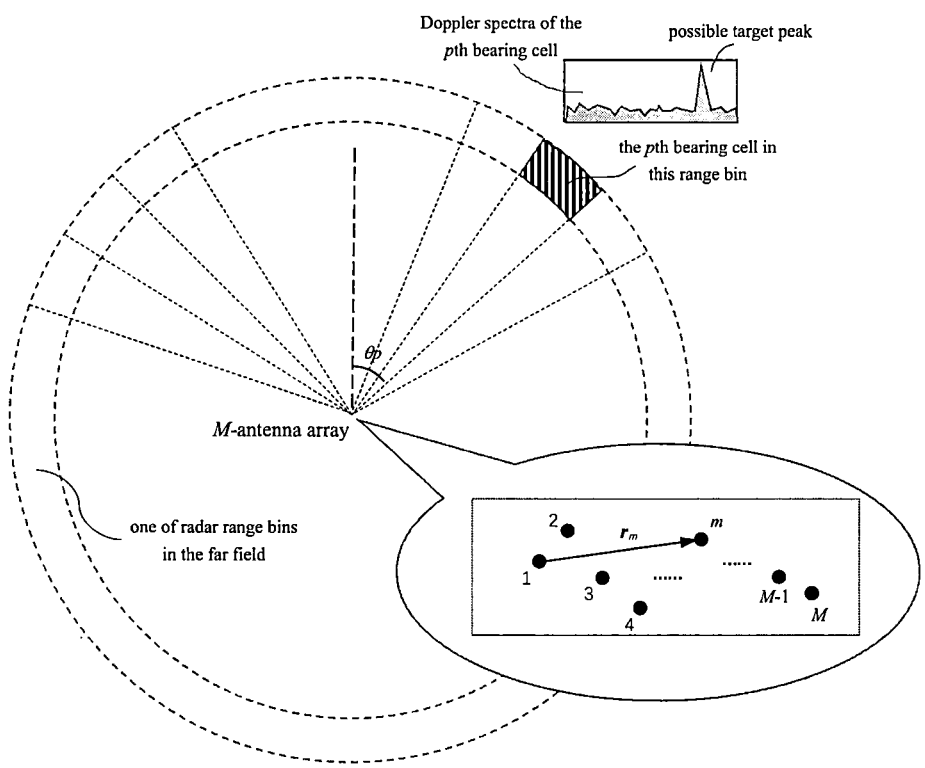
FIG. 1: Range and bearing geometry of radar detection with an M-Antenna array

The invention deals with range signals from coherent Doppler radar system, i.e., complex time series signals from any range bin have been obtained. Given that P narrow-band far-field echo signals from a certain range bin in a radar's coverage impinge on an M-antenna array (FIG. 1) from directions $\theta=[\theta_1, \theta_2, \ldots, \theta P]^T$, where $(\cdot)^T$ represents the transpose operation. The array output vector X(t) at time t is described by $$X(t)=AS(t)+N(t), \quad (1)$$

and $S(t)=[s_1(t), s_2(t), \ldots, s_P(t)]^T$ Of denotes the signal vector with zero mean. N(t) represents the additive noise vector with zero mean and $\sigma_n^2$ variance, which is supposed to be temporally and spatially white. Furthermore, we suppose that the first antenna of the array is the reference antenna and its location is fixed to the origin of co-ordinates.

A is the array manifold matrix, which is given by $$A=[a(\theta_1),a(\theta_2), \ldots, a(\theta_p), \ldots, a(\theta_P)] \quad (2)$$

where $$a(\theta_p)=[e^{j\omega_0 t}, e^{j(\omega_0 t - k_p \cdot r_2)}, \ldots, e^{j(\omega_0 t - k_p \cdot r_m)}, \ldots, e^{j(\omega_0 t - k_p \cdot r_M)}]^T \quad (3)$$

and $\omega_0$ is the center angular frequency of the signals, $k_p$ is the wave vector corresponding to pth signal and $r_m$ is the radial vector from the first antenna to the mth antenna, and $$k_p \cdot r_m = \frac{2\pi}{\lambda_0} d_{mp} = [x_m \ y_m][\sin\theta_p \ \cos\theta_p]^T \quad (4)$$

in which $\lambda_0$ denotes the center wavelength of the signals. $(x_m, y_m)$ are co-ordinates of the mth antenna and di m is the spatial distance component between the mth antenna and the first antenna along the arriving direction of the pth signal.

In traditional array signal processing problems, the antennas are treated as stationary as they be and the $e^{j\omega_0 t}$ in (3) is the same for all antenna terms thus can be replaced by 1.

Figure 2:
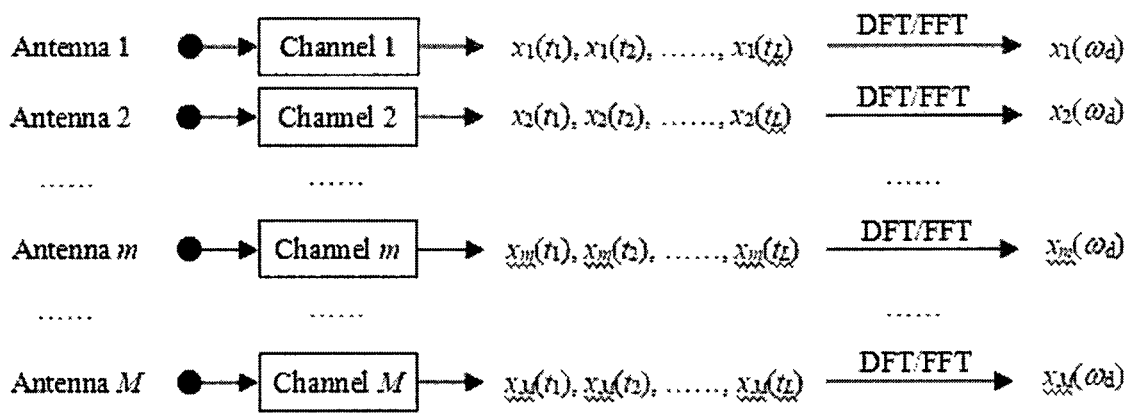
FIG. 2: Flow chart of traditional array signal processing

In Doppler radar system, after obtaining digital signal time series from each antenna channel within the cumulative time period, a Discrete Fourier Transform (DFT) or Fast Fourier Transform (FFT) operation is often imposed on the series to get the Doppler spectra. For the signal model of (1), its Doppler spectra is expressed as $$X(\omega_d)=AS(\omega_d)+N(\omega_d) \quad (5)$$

where $\omega_d$ and is the echo's Doppler shift from $\omega_0$, and the manifold matrix A keeps the same form as in (2) but with the $e^{j\omega_0 t}$ factor disappeared because of base band filtering in receiver process. FIG. 2 depicts the flow chart of traditional array signal processing.

Now suppose another case where there is only one moving antenna that receiving echoes from those P narrow-band far-field targets. The antenna's output x(t) is $$x(t)=\Sigma_{p=1}^P e^{j(\omega_0 t - k_p \cdot r(t))} s_p(t)+N(t), \quad (6)$$

where r(t) is the radial vector from the co-ordinates' origin to the antenna position at time t.

For the signal model of (6), after the DFT/FFT operation the output Doppler spectra will be the convolution between $s_p(\omega_d)$ and $\mathcal{F}[e^{-jk_p \cdot r(t)}]$, the FFT spectra of $e^{-jk_p \cdot r(t)}$, e.

$$x(\omega'_d)=\Sigma_{p=1}^P=\{\mathcal{F}[e^{-jk_p \cdot r(t)}]*s_p(\omega_d)\}|\omega'_d+N(\omega'_d) \quad (7)$$

where * denotes convolution operation, and $\omega'_d$ stands for the combined Doppler shift containing contributions both from echo's $\omega_d$ and the equivalent Doppler shift caused by antenna movement. Equation (7) suggests that if the antenna is designed to move along R different routines, then we will obtain R possibly different Doppler spectra, from which the DOA information in $k_p$ may be extracted in a definite manner by solving a system of linear equations, for R can be designed to be much larger than the antenna number M in equation (1).

2. Principle of BASICS

Now we manage to generate virtual movements of an antenna from an array of immobile antennas, so that the DOA estimation advantages described in equation (7) can be exploited. Because a radar system samples signals at discrete moments, a moving antenna appears at different locations at different sampling moments. When two consecutive samples appear, one cannot tell whether they are the outputs from two separately located immobile antennas at consecutive sampling moments, or they are the outputs of a moving antenna which locates just exactly at positions of those two antennas at the consecutive moments. Thus, we can generate equivalent moving antenna samplings from those of an array of immobile antennas.

Figure 3:
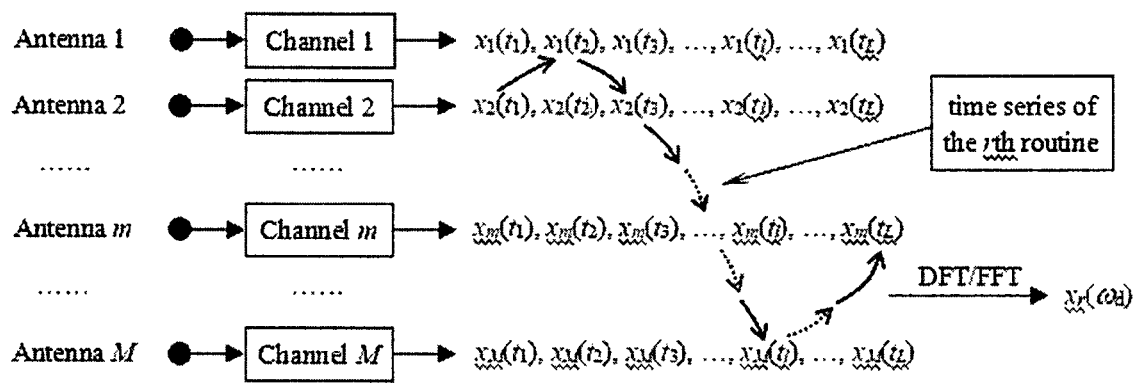
FIG. 3: An example of braided array signal sampling in BASICS

FIG. 3 demonstrates an example of how to engender time series of a moving antenna from the samplings of an immobile M antenna array. We call this procedure "Braided Sampling," because rather than analyzing each antenna's data separately, we "braid" them together to generate much more pictures for analysis. For a L points time series, there are $R=M^L$ different sampling braiding routines theoretically. After DFT/FFT of those time series, we will obtain many Doppler spectra in which the DOA information is convoluted by antenna movements as depicted in equation (7). In practice, there are not as many as $M^L$ braided sampling routines that can be used for DOA estimation. Because of the existence of noises, many slightly different routines make almost no significant differences in their Doppler spectra and cannot be of help in calculations. The most important reason is the constraint cast by Nyquist-Shannon Sampling Theorem, the combination of virtual movement velocity and the target's real velocity should not exceed the allowed maximum velocity corresponding to the sample interval time.

If no movement is assumed on antenna, then by Nyquist-Shannon Sampling Theorem, we only need to make sure that the Doppler Shift of targets, $\omega_d$, is less than $\pi f_s$, where $f_s$ is the radar sample rate. However, since the antenna is "moving" in our case, we must consider to enhance $f_s$ to satisfy Nyquist-Shannon Sampling Theorem.

Note that $$e^{-jk_p \cdot r(t)} = e^{-j[k_p \cdot \frac{r(t)}{t}]t} = e^{-j[k_p \cdot \overline{v}(t)]t} \quad (8)$$

where $$\overline{v}(t) = \frac{r(t)}{t}$$

is the mean velocity at moment t averaged from sample start, and its direction is from co-ordinate origin pointing to the antenna's current position. The $k_p \cdot \bar{v}(t)$ has the dimension of angular frequency and can be denoted as $\omega_v$. Then we let $\mathcal{F}[e^{-jk_p \cdot r(t)}] = f_p(\omega'_d)$, equation (7) changes to $$x(\omega'_d) = \Sigma_{p=1}^{P}[f_p(\omega_v) * s_p(\omega_d)]|_{\omega'_d} + N(\omega'_d) = \Sigma_{p=1}^{P}\int_{-\infty}^{\infty} f_p(\omega) s_p(\omega'_d - \omega) d\omega + N(\omega'_d) \quad (9)$$

From (8) $\omega_v$ can be positive or negative, suppose its range is $[\omega_{vmin}, \omega_{vmax}]$. And target's Doppler range is $[\omega_{dmin}, \omega_{dmax}]$. According to definition of convolution, the $\omega'_d$ in (7) and (9) should be within the range of $[\omega_{vmin}+\omega_{dmin}, \omega_{vmax}+\omega_{dmax}]$. The Nyquist-Shannon Sampling Theorem requires that the $f_s$ of a complex number sampling should satisfy $$2\pi f_s > [(\omega_{vmax}+\omega_{dmax})-(\omega_{vmin}+\omega_{dmin})] \quad (10)$$

In our scheme of engendering virtual movement from immobile antennas array, enhancing $f_s$ means transition interval between antennas are reduced and the $\omega$ vmax may also enhances as well. To keep $\omega_{vmax}$ not enhance as $f_s$ does, the virtual routines as shown in FIG. 3 should not contain steps of jumping between antennas located far apart. And in the same time, the distances between antennas should be reduced somehow. Thus, the constraint of (10) suggests the array aperture, configuration, distances between antennas in the array should be deliberately designed as well as the virtual routines design. However, the Nyquist-Shannon Sampling Theorem constraint as indicated in (10) has not yet been proved to be the necessary condition for unbiased or unambiguous DOA estimation in BASICS applications.

The above constraints are not so harassing because in (8) as t becomes larger and larger, the $\omega_v$ from virtual movement will decrease almost linearly for finite aperture array. The largest $\omega_v$s normally come from initial steps of virtual movement.

3. Algorithm of BASICS

As discussed in the above sections, BASICS obtain DOA information in Doppler domain. An L points time series corresponds to the same point number Doppler spectra. For an M-element array, if we design R different virtual routines, we can get RL linear equations from (9). For a certain range bin, the unknowns of the equation system are Doppler spectra in every bearing cell. If bearing cells number is D, Doppler spectra point number in every direction cell is L' (L' normally less than L as discussed in the context of formula (10)), then the total, unknowns' number is DL', which is much less than RL. By solving the equation system, we will obtain the Doppler spectra result in every bearing cell, and directly get the DOA information of possible targets.

To sum up, BASICS can be addressed as the following process:

1. For a fixed range bin, randomly generate an ordered list of M elements $\{i_1, i_2, \ldots, i_l, \ldots, i_L\}$, with each element be in $\{r_m | m \in \{1, 2, \ldots, M\}\}$. Each list represents a virtual movement routine of a single antenna such that it is at $r_{ij}$ when t=1.
2. Check if this movement satisfies the requirement given in inequality (10).
3. If false, go to step 1; if true, make a time series of L samples corresponding to this movement.
4. Do DFT/FFT on the time series in 3, generating a spectrum consists of L points, which corresponds to the left side of equation (9).
5. Calculate the mean square error between the spectrum in 4 and each spectrum of the previous found virtual routines, and then calculate the ratio between the error and the square sum of the spectrum points.
6. If the ratio in 5 is less than a pre-defined value (e.g., 10%), discard this routine and go to step 1; otherwise, this routine is saved as a valid routine into routine dataset.
7. For the routine found in 6, discretizing the integral at the right side of equation (9) (by dividing the radar bearing scope into D cells, and L' unknown spectra points in each cell, thus there are DL' unknowns in this range bin), to get L linear equations for this movement.
8. Repeat Steps 1-7 to find more valid virtual routines and generate more groups of equations with L equations in each group, until group number R satisfies RL>αDL', in which α is a real number coefficient and α>1.0. If such a R could not be reached, it means the array antenna number is too few or the array geometry is too confined and the array should be redesigned.
9. Solve these RL equations to obtain the Doppler spectra result in every bearing cell on a radar range bin.
10. Scan the Doppler spectra obtained in 9 to find whether there are targets in the bearing cell as a target would appear to be a peak in the Doppler spectra, and the founded target(s) share the same DOA that is the direction of the cell's center.
11. Step 10 is repeated for all bearing cells in the range bin to find all possible targets' DOAs and Doppler information in this range bin.
12. Step 11 is repeated for all radar range bins to find all possible targets' DOAs and Doppler information in the radar's coverage.
13. The routine dataset constructed in step 6 and 8 can be reused in subsequent radar data process, i.e., if the routine dataset has been constructed, radar data process steps may started from step 9, as long as the array geometry and data sample rate keep the same.

4. Variations of BASICS Application

In the above sections, we introduce the principles of BASICS by engendering virtual movement from immobile antennas, that is a kind of frequency modulation, as described in FIG. 3 and equation (6)~(8). In fact, the virtual movement, or to say the virtual variation or the artificial Doppler shifts can also be produced by amplitude modulation (switching between pattern-different antennas co-located at the same place), or simultaneously by frequency modulation and amplitude modulation (switching between pattern-different antennas located at different locations in an array). The signal model of (6) and (7) can be expanded as $$x(t) = \Sigma_{p=1}^{P} A(\theta,t) e^{j[\omega_0 t - k_p \cdot r(t)]} sp(t) + N(t), t=1,2,\ldots,L \quad (11)$$

and $$x(\omega'_d) = \Sigma_{p=1}^{P} \{\mathcal{F}[A(\theta,t) e^{-jk_p \cdot r(t)}] * s_p(\omega_d)\}|\omega'_d + N(\omega'_d) \quad (12)$$

where $A(\theta, t)$ depicts the variation of antenna pattern's changing with bearing and time. For this model, the above stated BASICS principle and algorithm can also be applied.

NON-PATENT CITATION

1. Capon, J. "High-resolution frequency-wavenumber spectrum analysis." Proc. IEEE. Vol. 57, pp. 1408-1418, August, 1969.
2. Schmidt, R. O. "Multiple emitter location and signal parameter estimation." IEEE Transactions on Antennas and Propagation. AP-34(3): 276-280. March, 1986.

3. Barrick, D. E., and B. J. Lipa. "Evolution of bearing determination in HF current mapping radars." Oceanography. Vol. 10. No. 2, pp. 72-75. January, 1997.
4. R. Roy and T. Kailath, "ESPRIT-estimation of signal parameters via rotational invariance techniques," in IEEE Transactions on Acoustics, Speech, and Signal Processing, vol. 37, no. 7, pp. 984-995, July 1989.
5. Barabell, A., Capon, J., DeLong, D., Johnson, J., & Senne, K. (1998). Performance comparison of superresolution array processing algorithms. revised. MIT Lincoln Lab., Tech. Rep.

The invention claimed is:

1. A Direction-Finding technique for Direction of Arrival estimation on an array of immobile antennas, comprising the steps of:

for every radar range bin, randomly generate a virtual movement for an imagined antenna from an array of immobile antennas, such that at every sampling moment, the movement arrives at the location of a certain real antenna of the array of antennas; and check if the virtual movements satisfy the constraint described by $2\pi f_s > [(\omega_{vmax}+\omega_{dmax})-(\omega_{vmin}+\omega_{dmin})]$, where $f_s$ is the complex number sampling rate, $\omega_{vmin}$ and $\omega_{vmax}$ are the minimum and maximum artificial Doppler shift caused by virtual antenna movement or variation, $\omega_{dmin}$ and $\omega_{dmax}$ are the minimum and maximum Doppler shift of possible real targets; and for each imagined antenna whose movement satisfies the above requirement, generate a time domain signal series by braiding the sample received by every real antenna channel, wherein at each sampling moment, the sample received by the imagined antenna is the signal received by the real antenna that shares the same location with the moving imagined antenna at that sampling moment; and generate a frequency domain spectrum for each imagined routine based, on the time series we just got; and calculate the mean square error between the spectrum and each spectrum of the previous saved imagined antennas, and then calculate the ratio between the error and the square sum of the spectrum points, save this imagined antenna and its frequency domain spectrum if the ratio is above a pre-defined value (e.g., 10%); and for each saved frequency domain spectrum, list a series of equations with left-hand side being the amplitude of signal at each frequency $\omega_d$ on the spectrum, and right-hand side being the sum of P convolutions between the DFT/FFT of virtual antenna movement and the DFT/FFT of signal vector of each moving target at frequency $\omega_d$, where the integral of convolution is discretized by dividing the radar bearing scope into many bearing cells; and solve all the equations generated by the step above to obtain the Doppler spectra result in one bearing cell; and repeatedly all the steps above for each bearing cell in the range bin to find all possible targets' DOAs and Doppler information in this range bin; and repeat all the steps above for all radar range bins to find all possible targets' DOAs and Doppler information in the radar's coverage.

2. The method of claim 1, further comprising the method of how to braid the signal time series of imagined moving antenna, wherein the sample of an imagined antenna at each sampling moment is given by the sample of the real, immobile antenna that the corresponding virtual movement reaches at the sampling moment.

3. The method of claim 1, further comprising the proof of the required average speed limit of virtual movements in BASICS to avoid aliasing, wherein the limit is specified as $2\pi f_s > [(\omega_{vmax}+\omega_{dmax})-(\omega_{vmin}+\omega_{dmin})]$, where $f_s$ is the complex number sampling rate, $\omega_{vmin}$ and $\omega_{vmax}$ are the minimum and maximum artificial Doppler shift caused by virtual antenna movement or variation, $\omega_{dmin}$ and $\omega_{dmax}$ are the minimum and maximum Doppler shift of possible real targets, and the proof is a combination of Nyquist-Shannon Sampling Theorem and Convolution Theorem.

4. The method of claim 1, with the virtual movement, or to say the virtual variation, or the artificial Doppler shifts which is the essential ideal of this patent, can also be produced simultaneously by frequency modulation and amplitude modulation, for example, switching between pattern-identical antennas or pattern-different antennas located at different locations in an array.

5. The method of claim 1, with the number of virtual movements R for solving DOA estimation in one radar range bin, should satisfy the condition that $RL > \alpha DL'$, where L is the number of equations generated by one virtual movement, $\alpha$ is a real number constant and $\alpha > 1.0$, D is the number of bearing cells of one range bin, and L' is the unknown spectra points in each bearing cell.

6. The method of claim 1, with the virtual movement, or to say the virtual variation, or the artificial Doppler shifts which is the essential ideal of this patent, can also being produced by amplitude modulation, for example, switching between pattern-different antennas co-located at the same spot.

7. The method of claim 1, with the bearing cells, as indicated in FIG. 1 as plain sections of 2-dimensional range bin ring, can also be spherical parts of 3-dimensional range bin shell, whose directions are described by bearings and elevations.

* * * * *